(12) United States Patent
Nagata et al.

(10) Patent No.: US 11,017,054 B2
(45) Date of Patent: May 25, 2021

(54) COLLAPSE STRENGTH PREDICTION METHOD

(71) Applicant: NIPPON STEEL & SUMITOMO METAL CORPORATION, Tokyo (JP)

(72) Inventors: Yukinobu Nagata, Tokyo (JP); Yuusuke Ichinose, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 232 days.

(21) Appl. No.: 16/337,691

(22) PCT Filed: Oct. 16, 2017

(86) PCT No.: PCT/JP2017/037425
§ 371 (c)(1),
(2) Date: Mar. 28, 2019

(87) PCT Pub. No.: WO2018/074433
PCT Pub. Date: Apr. 26, 2018

(65) Prior Publication Data
US 2020/0034403 A1    Jan. 30, 2020

(30) Foreign Application Priority Data
Oct. 18, 2016 (JP) .............................. JP2016-204404

(51) Int. Cl.
| | | |
|---|---|---|
| *G06F 17/11* | (2006.01) | |
| *G06F 30/23* | (2020.01) | |
| *G06F 17/10* | (2006.01) | |

(52) U.S. Cl.
CPC .............. *G06F 17/11* (2013.01); *G06F 17/10* (2013.01); *G06F 30/23* (2020.01)

(58) Field of Classification Search
None
See application file for complete search history.

(56) References Cited

U.S. PATENT DOCUMENTS 7,690,553 B2 * 4/2010 Komlos ................. B23K 37/00
228/173.1

FOREIGN PATENT DOCUMENTS

| CN | 1871369 A | 11/2006 |
|---|---|---|
| CN | 101845939 A | 9/2010 |

(Continued)

OTHER PUBLICATIONS

Deng et al., "New High Collapse Model to Calculate Collapse Strength for Casing," Engineering Failure Analysis, vol. 58, ISSN: 1350-6307, DOI: 10.1016/J.ENGFAILANAL.2015.08.036, Sep. 1, 2015, pp. 295-306, XP029288587.

(Continued)

*Primary Examiner* — Steven M Christopher
(74) *Attorney, Agent, or Firm* — Birch, Stewart, Kolasch & Birch, LLP.

(57) ABSTRACT

A collapse strength prediction method of a steel pipe includes deriving a prediction equation indicating a relationship among D/t obtained by dividing an outer diameter D (mm) by a thickness t (mm), material characteristics, a collapse strength dominant factor, and a collapse dominant proof stress ($\sigma_{CDOS}$) of the steel pipe using a plurality of reference steel pipes collapse whose strengths have been obtained in advance, obtaining D/t, material characteristics, a collapse strength dominant factor, and a predicted collapse strength of a steel pipe that is an evaluation subject, obtaining a compressive stress-strain curve in a circumferential direction of the steel pipe that is the evaluation subject, obtaining a stress that causes a permanent strain to be generated in the steel pipe that is the evaluation subject as the collapse dominant proof stress on the basis of the compressive stress-strain curve, and computing the predicted collapse strength of the steel pipe that is the evaluation subject from the D/t, the material characteristics, the (Continued)

collapse strength dominant factor, and the collapse dominant proof stress, which have been obtained, on the basis of the prediction equation, and the permanent strain is set according to a value of the D/t of the steel pipe that is the evaluation subject.

16 Claims, 3 Drawing Sheets

(56) References Cited

FOREIGN PATENT DOCUMENTS

| CN | 101898246 A | 12/2010 |
|---|---|---|
| CN | 103080354 A | 5/2013 |
| JP | 7-179941 A | 7/1995 |
| JP | 2005-8912 A | 1/2005 |

OTHER PUBLICATIONS

Lin et al., "Burst Strength of Tubing and Casing Based on Twin Shear Unified Strength Theory," PLOS One, vol. 9, No. 11, DOI: 10.1371/journal.pone.0111426, Nov. 14, 2014, pp. 1-7, XP055693942.

Lin et al., "Through-wall Yield Collapse Pressure of Casing Based on Unified Strength Theory," Petroleum Exploration and Development, vol. 43. No. 3, ISSN: 1876-3804, DOI: 10.1016/S1876-3804(16)30059-3, Jun. 2016, pp. 506-513, XP029629853.

Liu et al., "Equations to Calculate Collapse Strength of Defective Casing for Steam Injection Wells," Engineering Failure Analysis, vol. 42, ISSN: 1350-6307, DOI: 10.1016/j.engfailanal.2014.03.010, Jul. 2014 (Available online Apr. 5, 2014), pp. 240-251, XP055693946.

Netto, "On the Effect of Narrow and Long Corrosion Defects on the Collapse Pressure of Pipelines," Applied Ocean Research, vol. 31, No. 2, ISSN: 0141-1187, DOI: 10.1016/J.APOR.2009.07.004 Apr. 2009, pp. 75-81, XP026688411.

"Submarine Pipeline Systems", DET Norske Veritas, Offshore Standard DNV-OS-F101, Oct. 2007, pp. 1-240.

"Formulas and Calculations for Casing, Tubing, Drill Pipe, and Line Pipe Properties", American Petroleum Institute: API BUL 5C3, Fourth Edition, Feb. 1, 1985, total 10 pages.

"Manual for Steel Pipe for Oil Well and Pipeline", The Japanese Association for Petroleum Technology, Dec. 15, 1992, pp. 68-70, total 13 pages.

"Petroleum and natural gas industries—Formulae and calculations for the properties of casing, tubing, drill pipe and line pipe used as casing or tubing", ISO/TR 10400, Second edition, 2018, total 238 pages.

International Search Report for PCT/JP2017/037425 dated Nov. 21, 2017.

Tamano et al., "Collapse Strength of Commercial Casing under Combined External Pressure and Axial Load", Journal of the JSTP, 1989, vol. 30, No. 338, pp. 385-390.

Written Opinion of the International Searching Authority for PCT/JP2017/037425 (PCT/ISA/237) dated Nov. 21, 2017.

Chinese Office Action and Search Report for counterpart Chiriese Application No. 201780063939.4, dated Dec. 13. 2019, with partial English translation.

Mimaki et al., "Finite-Element Analysis and Formulas of Collapse Strength of Worn Casing," Memoirs of the Japan Machinery Society, Compilation A, vol. 61, Issue 584, Apr. 30, 1995, pp. 145-151, with abstract.

* cited by examiner

COLLAPSE STRENGTH PREDICTION METHOD

TECHNICAL FIELD OF THE INVENTION

The present invention relates to a collapse strength prediction method.

Priority is claimed on Japanese Patent Application No. 2016-204404 filed in Japan, Oct. 18, 2016, the content of which is incorporated herein by reference.

RELATED ART

For steel pipes for oil country tubular goods or seabed pipelines that are used under external pressure, high collapse characteristics is demanded. In addition, there is a concern that the occurrence of collapse in these steel pipes may be immediately accompanied by a catastrophe, and thus it is necessary to accurately know the collapse strength thereof.

Generally, for steel pipes having a diameter of 16 inches or less, the collapse value is measured by a collapse test; however, for steel pipes having a large diameter, it is difficult to carry out the collapse test, and thus there is a difficulty in accurately knowing the collapse value.

There is a method in which the collapse value is estimated by a finite element analysis (FEA), and the collapse value can be accurately estimated, but a great amount of effort is required. Therefore, there has been a desire for a method for predicting a highly accurate collapse value using an estimation equation.

In Non-Patent Document 1, a method for calculating the biaxial collapse strength of a seamless steel pipe for an oil country and the like is proposed.

On a seamless steel pipe as described above, quenching and tempering are carried out, and thus the strengths in an L direction (the longitudinal direction of the steel pipe) and in a C direction (the circumferential direction) are equal to each other.

In the method disclosed in Non-Patent Document 1, it is possible to estimate the collapse strength in a biaxial stress field of a small-diameter oil country tubular good to which a seamless steel pipe is applied, but there is a problem in that this method is not applicable to a large-diameter oil country tubular good to which a welded pipe is applied.

In addition, Non-Patent Document 1 does not examine collapse patterns and their influence on the collapse strength.

PRIOR ART DOCUMENT

Patent Document

[Non-Patent Document 1] Toshitaka Tamano, Yasusuke Inoue, and Toshitaro Mimaki, "Collapse strength of Commercial Casing under Combined External Pressure and Axial Load", Journal of The Japan Society for Technology of Plasticity, 1989, Vol. 30, No. 338, pp. 385 to 390

[Non-Patent Document 2] American Petroleum Institute: API BUL 5C3, 1985

DISCLOSURE OF THE INVENTION

Problems to be Solved by the Invention

In the collapse strength prediction of the related art, the subject was a yielding elongation-type SS curve as shown in FIG. 1(a). Meanwhile, FIG. 1(a) is a view showing a yielding elongation-type SS curve described in Non-Patent Document 1.

In the case of a steel pipe having the above-described yielding elongation-type SS curve, it is possible to predict the collapse strength at a certain accuracy using the 0.20% proof stress. For example, the seamless steel pipe described in Non-Patent Document 1 is heat-treated and thus exhibits the above-described yielding elongation-type SS curve.

However, the tendency of the SS curve varies depending on the formation method of a steel pipe or the presence or absence of a heat treatment. For example, an electric resistance welded steel pipe on which no heat treatment is carried out exhibits a round-type SS curve as shown in FIG. 1(b). In the above-described round-type SS curve, a clear yielding phenomenon does not appear, and, when the collapse strength is predicted and calculated using the 0.20% proof stress as in the related art, the collapse strength is affected by the round shape of the SS curve, and there has been a problem in that the prediction and calculation of a highly accurate collapse strength is not possible.

For example, even in the case of a welded pipe other than the electric resistance welded steel pipe such as a UO steel pipe, a complicated SS curve is exhibited, and there is the same problem of the incapability of the prediction and calculation of a highly accurate collapse strength.

The present inventors carried out intensive studies regarding a collapse strength prediction method which is applicable to steel pipes having a variety of dimensions and obtained the following knowledge.

In the collapsing phenomenon of a steel pipe, yield collapse, plastic collapse, transition collapse, and elastic collapse appears in sequence as D/t increases (refer to Non-Patent Document 2). At this time, as D/t increases, the collapse strength decreases.

In addition, for the estimation of the collapse strength, the value of a stress that is highly correlated with the collapse strength, that is, the collapse dominant proof stress is required. In the related art, the value of a stress generating a 0.20% permanent strain which is generally defined as proof stress has been used as the collapse dominant proof stress.

However, for steel pipes exhibiting a stress-strain curve (SS curve) in which the stress smoothly increases as the strain increases or a complicated SS curve, the yield stress is not evident. Therefore, the value of the yield strain of the steel pipe varies depending on the shape of the SS curve, and there is a case in which the use of the 0.20% permanent strain is not appropriate.

The present inventors found that, when a numeric value corresponding to the value of the permanent strain of a compressive SS curve in a steel pipe circumferential direction is employed as the collapse dominant proof stress, a collapse strength prediction equation that is applicable to steel pipes having a variety of dimensions can be provided. The selection of the value of the permanent strain significantly changes the collapse dominant proof stress.

The present inventors' studies clarified that the stress that is highly correlated with the collapse strength, that is, the collapse dominant proof stress changes along D/t. That is, the present inventors found that a highly accurate collapse strength can be predicted by setting an appropriate collapse dominant proof stress depending on the value of D/t.

The present invention has been made on the basis of the above-described knowledge.

An object of the present invention is to provide a collapse strength prediction method capable of accurately predicting the collapse strengths of steel pipes having a variety of dimensions.

Means for Solving the Problem (1) A collapse strength prediction method according to the present invention is a method for predicting a collapse strength of a steel pipe, the method including: deriving a prediction equation indicating a relationship among D/t obtained by dividing an outer diameter D (mm) by a thickness t (mm), material characteristics, a collapse strength dominant factor, a collapse dominant proof stress, and a predicted collapse strength of the steel pipe using a plurality of reference steel pipes collapse whose strengths have been obtained in advance; obtaining D/t obtained by dividing an outer diameter D (mm) by a thickness t (mm), material characteristics, and a collapse strength dominant factor of a steel pipe that is an evaluation subject; obtaining a compressive stress-strain curve in a circumferential direction of the steel pipe that is the evaluation subject; obtaining a stress that causes a permanent strain to be generated in the steel pipe that is the evaluation subject as the collapse dominant proof stress on the basis of the compressive stress-strain curve; and computing the predicted collapse strength of the steel pipe that is the evaluation subject from the D/t, the material characteristics, the collapse strength dominant factor, and the collapse dominant proof stress, which have been obtained, on the basis of the prediction equation, in which the permanent strain is set according to a value of the D/t of the steel pipe that is the evaluation subject.

According to the above-described aspect, the permanent strain is set according to the value of the D/t of the steel pipe that is the evaluation subject, and thus it is possible to provide a collapse strength prediction method capable of accurately predicting collapse strengths of steel pipes having a variety of dimensions.

Meanwhile, in the present specification, a stress that is imparted when an X % permanent strain is generated is defined as the "X % proof stress". In addition, the X % proof stress is represented by "$\sigma_X$".

In addition, a permanent strain that is used to obtain the collapse dominant proof stress is represented by "CDOS", and the collapse dominant proof stress is represented by "$\sigma_{CDOS}$".

(2) According to another aspect of the present invention, in the collapse strength prediction method according to (1), the collapse dominant proof stress may be a 0.50% proof stress in a case in which the value of D/t of the steel pipe that is the evaluation subject is in a yield collapse region, may be a 0.10% proof stress in a case in which the value of D/t is in a plastic collapse region, and may be 0.05% proof stress in a case in which the value of D/t is in a transition collapse region or an elastic collapse region.

(3) According to still another aspect of the present invention, in the collapse strength prediction method according to (1), the collapse dominant proof stress may be a 0.50% proof stress in a case in which the value of D/t of the steel pipe that is the evaluation subject is 10, may be a 0.10% proof stress in a case in which the value of D/t is 19, may be a 0.05% proof stress in a case in which the value of D/t is 28 to 48, may be obtained by interpolation calculation of the 0.50% proof stress and the 0.10% proof stress in a case in which the value of D/t is more than 10 and less than 19, and may be obtained by interpolation calculation of the 0.10% proof stress and the 0.05% proof stress in a case in which the value of D/t is more than 19 and less than 28.

(4) According to still another aspect of the present invention, in the collapse strength prediction method according to (1), the permanent strain may be represented by Equation 1 or Equation 2.

In the case of D/t≤28:

$$CDOS(\%) = \exp(5.522) \times (D/t)^{-2.719} + 0.02 \quad \text{(Equation 1)}$$

In the case of D/t>28:

$$CDOS(\%) = 0.05 \quad \text{(Equation 2)}$$

(5) According to still another aspect of the present invention, in the collapse strength prediction method according to any one of (1) to (4), the material characteristics may include a Young's modulus and a Poisson's ratio of the steel pipe that is the evaluation subject; and the collapse strength dominant factor may include one or more selected from an ovality, an eccentricity, and a residual stress in the circumferential direction of the steel pipe.

(6) According to still another aspect of the present invention, in the collapse strength prediction method according to (5), the prediction equation may be represented by Equation 3.

$$P_c = \gamma(0.5(P_E + P_Y) - \sqrt{0.25(P_E - P_Y)^2 + P_E P_Y H}) \quad \text{(Equation 3)}$$

Here, $P_C$ in Equation 3 is the predicted collapse strength, $P_E$ and $P_Y$ are an elastic collapse strength and an entire surface yield strength respectively, and H and γ are correction terms and are computed using Equation 4 to Equation 15. Meanwhile, in Equation 4 to Equation 15, E is the Young's modulus, v is the Poisson's ratio, u is the ovality represented by Equation 11, e is the eccentricity represented by Equation 12, $\sigma_{R0}$ is the residual stress in the circumferential direction, $\sigma_{CDOS}$ is the collapse dominant proof stress, and values represented by $h_\alpha$, $h_\beta$, $h_\gamma$, $\alpha, \beta$, $\zeta$, and $\eta$ are coefficients that are obtained in advance.

$$P_E = 2\left(\frac{E}{1-v^2}\right)\left(\frac{1}{D/t(D/t-1)^2}\right)F_E(D/t)G_E(\sigma_{CDOS}) \quad \text{(Equation 4)}$$

$$P_Y = 2\sigma_{CDOS}\frac{D/t-1}{(D/t)^2}\left[1 + \frac{1.47}{D/t-1}\right]F_Y(D/t)G_Y(\sigma_{CDOS}) \quad \text{(Equation 5)}$$

$$H = h_\alpha u(\%) + h_\beta e(\%) + h_\gamma\left(\frac{\sigma_{R\theta}}{\sigma_{CDOS}}\right) \quad \text{(Equation 6)}$$

$$F_E(D/t) = \sum_{i=1}^{5} \alpha_i^E (D/t)^{i-3} \quad \text{(Equation 7)}$$

$$F_Y(D/t) = \sum_{i=1}^{5} \alpha_i^Y (D/t)^{i-3} \quad \text{(Equation 8)}$$

$$G_E(\sigma_{CDOS}) = \sum_{i=1}^{5} \beta_i^E (\sigma_{CDOS})^{i-3} \quad \text{(Equation 9)}$$

$$G_Y(\sigma_{CDOS}) = \sum_{i=1}^{5} \beta_i^Y (\sigma_{CDOS})^{i-3} \quad \text{(Equation 10)}$$

Ovality $u$ (%) = (Equation 11)
(maximum outer diameter − minimum outer diameter)/ average outer diameter × 100

Eccentricity $e$ (%) = (Equation 12)
(maximum thickness − minimum thickness)/ average thickness × 100

-continued $$\gamma = F(u, D/t) - f(u)g(D/t) \quad \text{(Equation 13)}$$

$$f(u) = \sum_{i=1}^{3} \xi_i(u)^{i-1} \quad \text{(Equation 14)}$$

$$g(D/t) = \sum_{i=1}^{3} \eta_i(D/t)^{i-1} \quad \text{(Equation 15)}$$

(7) According to still another aspect of the present invention, in the collapse strength prediction method according to (6), Equation 7 may be represented by $$F_E(D/t) = 9.39 \times 10^{-1} + 3.37 \times 10^{-2} \times (D/t) - 3.70 \times 10^{-4} \times (D/t)^2 \quad \text{(Equation 16)},$$

Equation 8 may be represented by $$F_Y(D/t) = 1.17 - 1.35 \times 10^{-2}(D/t) - 3.49 \times 10^{-5} \times (D/t)^2 \quad \text{(Equation 17)},$$

Equation 9 may be represented by $$G_E(\sigma_{CDOS}) = 9.54(\sigma_{CDOS})^{-2} - 1.85 \times 10 \times (\sigma_{CDOS})^{-1} + 6.41 \times 10^{-1} + 4.57 \times 10^{-5} \times (\sigma_{CDOS}) \quad \text{(Equation 18)},$$

Equation 10 may be represented by $$G_Y(\sigma_{CDOS}) = 1 \quad \text{(Equation 19)},$$

Equation 14 may be represented by $$f(u) = 9.39 \times 10^{-1} + 1.11 \times 10^{-2} \times (u) + 2.15 \times 10^{-2} \times (u)^2 \quad \text{(Equation 20)}, \text{ and}$$

Equation 15 may be represented by $$g(D/t) = 1.08 + 7.06 \times 10^{-8} \times (D/t) + 7.85 \times 10^{-7} \times (D/t)^2 \quad \text{(Equation 21)}$$

Effects of the Invention

According to the present invention, it becomes possible to accurately predict the collapse strengths of steel pipes having a variety of dimensions.

EMBODIMENTS OF THE INVENTION

Figure 1:
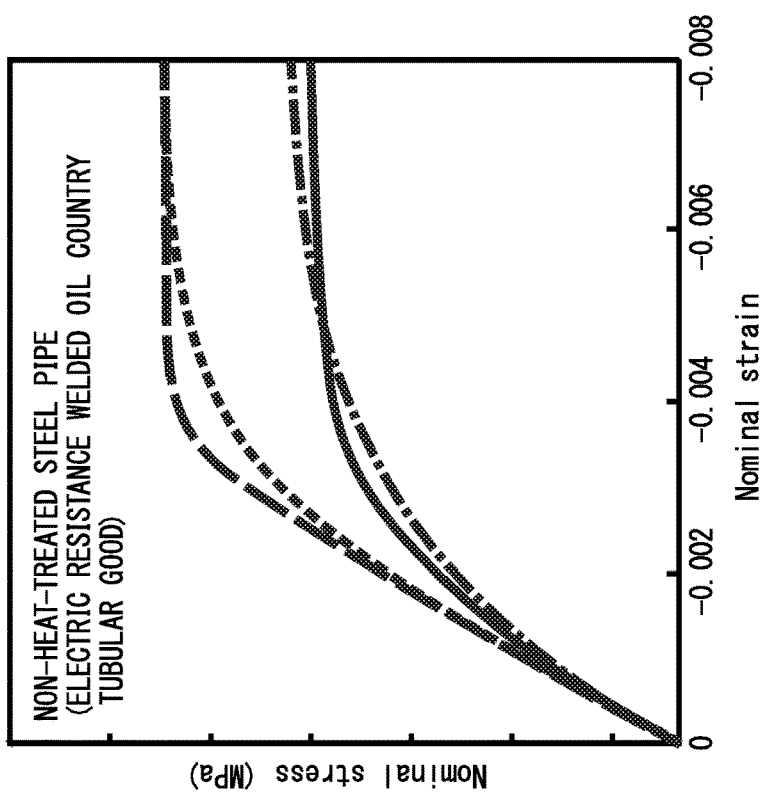
FIG. 1(a) is a view showing an example of a yielding elongation-type SS curve.
FIG. 1(b) is a view showing an example of a round-type SS curve.
Figure 1:
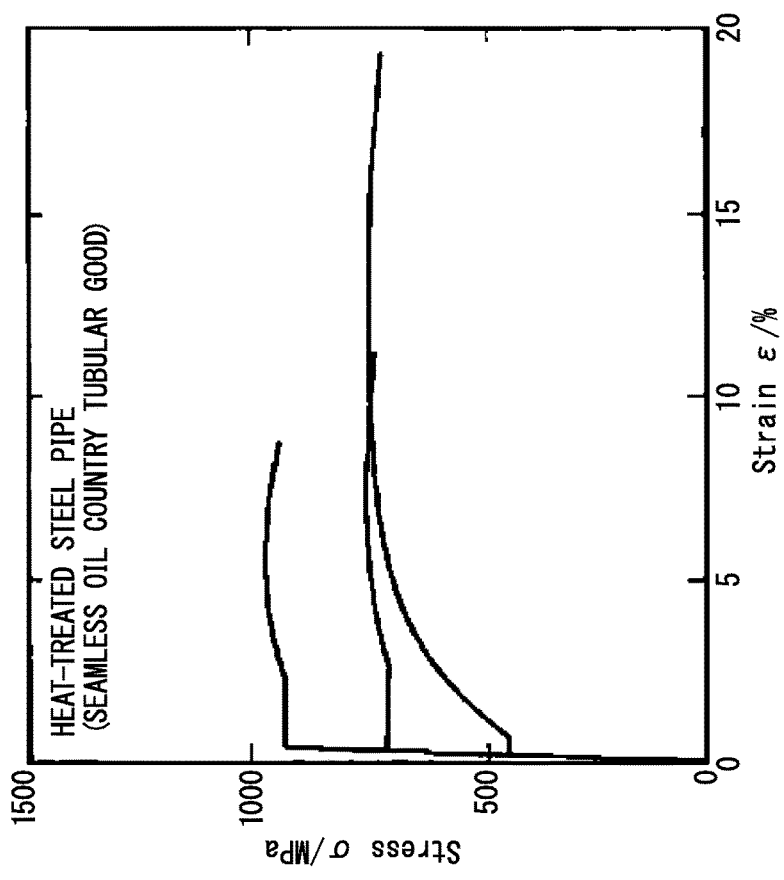

Hereinafter, a collapse strength prediction method according to an embodiment of the present invention will be described. However, obviously, the present invention is not limited to this embodiment.

A collapse strength prediction method according to the present embodiment is a method for predicting the collapse strength of a steel pipe and includes a step of deriving a prediction equation indicating a relationship among D/t obtained by dividing an outer diameter D (mm) by a thickness t (mm), material characteristics, a collapse strength dominant factor, a collaspe dominant proof stress, and a predicted collaspe strength of the steel pipe using a plurality of reference steel pipes the collapse whose strengths have been obtained in advance.

In addition, the collapse strength prediction method according to the present embodiment includes a step of obtaining D/t obtained by dividing an outer diameter D (mm) by a thickness t (mm), material characteristics, and a collapse strength dominant factor of a steel pipe that is an evaluation subject. In addition, the collapse strength prediction method according to the present embodiment includes a step of obtaining a compressive stress-strain curve in the circumferential direction of the steel pipe that is the evaluation subject.

The collapse strength prediction method according to the present embodiment includes a step of obtaining a stress that causes a permanent strain to be generated in the steel pipe that is the evaluation subject as the collapse dominant proof stress on the basis of the compressive stress-strain curve.

The collapse strength prediction method according to the present embodiment further includes a step of computing the predicted collapse strength of the steel pipe that is the evaluation subject from the D/t, the material characteristics, the collapse strength dominant factor, and the collapse dominant proof stress, which have been obtained, on the basis of the prediction equation.

Here, in the collapse strength prediction method, the permanent strain is set according to the value of the D/t of the steel pipe that is the evaluation subject.

First, a prediction equation for predicting the collapse strength of the steel pipe is derived using a plurality of reference steel pipes the collapse whose strengths have been obtained in advance. As the prediction equation, an equation including parameters that indicate the relationship among the ratio D/t between the outer diameter D (mm) and the thickness t (mm), the material characteristics, the collapse strength dominant factor, the collapse dominant proof stress, and the predicted collapse strength of the steel pipe is preferably used. The prediction equation will be described below.

Next, for a steel pipe that is the evaluation subject, the ratio D/t between the outer diameter D (mm) and the thickness t (mm), the material characteristics, the collapse strength dominant factor, and the like are obtained.

(D/t)

D/t is the ratio between the outer diameter D (mm) and the thickness t (mm). According to the collapse strength prediction method according to the present embodiment, highly accurate prediction is possible even for steel pipes having D/t in a range of approximately 10 to 48.

(Collapse Strength Dominant Factor)

The ovality that is the collapse strength dominant factor is obtained by, for example, measuring the diameter of the steel pipe at four positions at 45° intervals and assigning the results to Equation 11.

The eccentricity that is the collapse strength dominant factor is obtained by, for example, measuring the thickness of the steel pipe at eight positions at 45° intervals and assigning the results to Equation 12.

The residual stress in the circumferential direction that is the collapse strength dominant factor is obtained using a Crampton method represented by Equation 22. The Crampton method is a method in which the residual stress is released by cutting a steel pipe in the longitudinal direction and the residual stress is obtained from the amount of the outer diameter changed before and after the cutting. In Equation 22, D0 represents the average outer form before cutting, and D1 represent the average outer form after cutting. Meanwhile, the length of a test specimen of the Crampton method is set to satisfy L/D (the ratio between the length L and the outer diameter D of the test specimen)≥2.

$$\sigma_{R\theta} = \frac{E}{1-v^2} t \left( \frac{1}{D_0} - \frac{1}{D_1} \right) \quad \text{(Equation 22)}$$

In the collapse strength prediction method according to the present embodiment, the material characteristics may include the Young's modulus and the Poisson's ratio of the steel pipe that is the evaluation subject. In addition, the collapse strength dominant factor may include one or more selected from the ovality, the eccentricity, and the residual stress in the circumferential direction of the steel pipe.

(Compressive Stress-Strain Curve)

Next, the compressive stress-strain curve (SS curve) in the circumferential direction (C direction) of the steel pipe is obtained. The compressive stress-strain curve is obtained by sampling a cylindrical test piece in the circumferential direction and carrying out a compression test.

For example, the compressive stress-strain curve can be obtained by carrying out the compression test using a cylindrical test piece having dimensions in which the diameter is 70% of the thickness of the steel pipe and the length is twice the diameter (140% of the thickness of the steel pipe). The position for sampling the cylindrical test piece may be an arbitrary position at 22.5°, 45°, 90° intervals or the like.

(Collapse Dominant Proof Stress)

Next, the collapse dominant proof stress is obtained on the basis of the obtained compressive stress-strain curve. As described above, the collapse dominant proof stress that is a stress highly correlated with the collapse strength varies depending on D/t. Therefore, a value of permanent strain corresponding to the value of D/t of the steel pipe is appropriately selected, and the proof stress at the permanent strain is obtained as the collapse dominant proof stress.

In the collapse strength prediction method according to the present embodiment, the value of the permanent strain is set according to the value of the D/t of the steel pipe that is the evaluation subject. In addition, a stress corresponding to the permanent strain set according to the value of the D/t of the steel pipe that is the evaluation subject is obtained on the basis of the compressive stress-strain curve, and this proof stress is considered as the collapse dominant proof stress.

In the collapse strength prediction method according to the present embodiment, the collapse dominant proof stress may be a 0.50% proof stress in a case in which the value of D/t of the steel pipe that is the evaluation subject is in a yield collapse region, may be a 0.10% proof stress in a case in which the value of D/t is in a plastic collapse region, and may be 0.05% proof stress in a case in which the value of D/t is in a transition collapse region or an elastic collapse region.

Here, for example, the 0.50% proof stress refers to a stress that is imparted when a 0.50% permanent strain is generated.

Here, the above-described collapse regions are based on the classification in Publication A (American Petroleum Institute: API BUL 5C3, 1985). According to the collapse pattern, the yield collapse region, the plastic collapse region, the transition collapse region, and the elastic collapse region are regulated, and, when collapse dominant proof stresses corresponding thereto are employed, more highly accurate collapse strengths can be predicted.

In the collapse strength prediction method according to the present embodiment, the collapse dominant proof stress may be a 0.50% proof stress in a case in which the value of D/t of the steel pipe that is the evaluation subject is 10, may be a 0.10% proof stress in a case in which the value of D/t of the steel pipe that is the evaluation subject is 19, and may be a 0.05% proof stress in a case in which the value of D/t of the steel pipe that is the evaluation subject is 28 to 48.

At this time, in a case in which the value of D/t of the steel pipe that is the evaluation subject is more than 10 and less than 19, the collapse dominant proof stress may be obtained by interpolation calculation of the 0.50% proof stress and the 0.10% proof stress and, in a case in which the value of D/t of the steel pipe that is the evaluation subject is more than 19 and less than 28, may be obtained by interpolation calculation of the 0.10% proof stress and the 0.05% proof stress.

An interpolation calculation method is not particularly limited, and the proof stresses may be interpolated into a straight line of a linear function or may be interpolated into a curve of an n-dimensional function, a logarithmic function, an exponential function, or the like.

In the collapse strength prediction method according to the present embodiment, the permanent strain (%) for obtaining the collapse dominant proof stress may be represented by Equation 1 in the case of D/t≤28:

$$CDOS(\%) = \exp(5.522) \times (D/t)^{-2.719} + 0.02 \quad \text{(Equation 1)}$$

The permanent strain may be represented by Equation 2 in the case of D/t>28:

$$CDOS(\%) = 0.05 \quad \text{(Equation 2)}$$

The permanent strain for obtaining the collapse dominant proof stress can be obtained using Equation 1 and Equation 2, and it is possible to predict a highly accurate collapse strength regardless of the grade of a steel pipe. In addition, the permanent strain for obtaining the collapse dominant proof stress can be obtained using Equation 1 and Equation 2, and it is possible to predict a highly accurate collapse strength regardless of the collapse region.

(Prediction Equation)

A predicted collapse strength of the steel pipe is computed from the D/t, the material characteristics, the collapse strength dominant factor, and the collapse dominant proof stress, which have been obtained in advance, using a prediction equation represented by Equation 3.

In an embodiment of the present invention, the material characteristics that are used in the prediction equation are the Young's modulus and the Poisson's ratio of the steel pipe. In addition, the collapse strength dominant factor refers to a cause having an influence on the collapse strength such as the shape of the steel pipe, and specific examples thereof include the ovality, the eccentricity, and the residual stress in the circumferential direction of the steel pipe.

In the prediction equation, all of these factors may be used or one or two of the factors may be used. For example, in the case of predicting the collapse strength of an electric resistance welded steel pipe, the eccentricity of the electric resistance welded steel pipe is extremely small, and thus it is possible to omit this factor.

In addition, as the prediction equation, for example, Equation 3 can be used.

$$P_C = \gamma(0.5(P_E + P_Y) - \sqrt{0.25(P_E - P_Y)^2 + P_E P_Y H}) \quad \text{(Equation 3)}$$

$P_C$ in Equation (i) is the predicted collapse strength, $P_E$ and $P_Y$ are the elastic collapse strength and the entire surface yield strength, and H and γ are correction terms.

$P_E$, $P_Y$, H and γ are computed using Equation 4 to Equation 15.

$$P_E = 2\left(\frac{E}{1-v^2}\right)\left(\frac{1}{D/t(D/t-1)^2}\right)F_E(D/t)G_E(\sigma_{CDOS}) \quad \text{(Equation 4)}$$

$$P_Y = 2\sigma_{CDOS}\frac{D/t-1}{(D/t)^2}\left[1+\frac{1.47}{D/t-1}\right]F_Y(D/t)G_Y(\sigma_{CDOS}) \quad \text{(Equation 5)}$$

$$H = h_\alpha u(\%) + h_\beta e(\%) + h_\gamma\left(\frac{\sigma_{R\theta}}{\sigma_{CDOS}}\right) \quad \text{(Equation 6)}$$

$$F_E(D/t) = \sum_{i=1}^{5}\alpha_i^E(D/t)^{i-3} \quad \text{(Equation 7)}$$

$$F_Y(D/t) = \sum_{i=1}^{5}\alpha_i^Y(D/t)^{i-3} \quad \text{(Equation 8)}$$

$$G_E(\sigma_{CDOS}) = \sum_{i=1}^{5}\beta_i^E(\sigma_{CDOS})^{i-3} \quad \text{(Equation 9)}$$

$$G_Y(\sigma_{CDOS}) = \sum_{i=1}^{5}\beta_i^Y(\sigma_{CDOS})^{i-3} \quad \text{(Equation 10)}$$

In the equations, E is the Young's modulus, v is the Poisson's ratio, u is the ovality represented by Equation 11, e is the eccentricity represented by Equation 12, $\sigma_{R0}$ is the residual stress in the circumferential direction, and $\sigma_{CDOS}$ is the collapse dominant proof stress.

Ovality $u$ (%) = (Equation 11)
(maximum outer diameter − minimum outer diameter)/ average outer diameter × 100

Eccentricity $e$ (%) = (Equation 12)
(maximum thickness − minimum thickness)/ average thickness × 100

$$\gamma = F(u, D/t) - f(u)g(D/t) \quad \text{(Equation 13)}$$

$$f(u) = \sum_{i=1}^{3}\xi_i(u)^{i-1} \quad \text{(Equation 14)}$$

$$g(D/t) = \sum_{i=1}^{3}\eta_i(D/t)^{i-1} \quad \text{(Equation 15)}$$

Meanwhile, the values represented by $h_\alpha$, $h_\beta$, $h_\gamma$, α,β, ζ, and η are coefficients that are obtained in advance. A method for computing these coefficients is not particularly limited, and the coefficients can be determined using, for example, the least-square method from errors between the actual measurement values and the predicted values of a plurality of reference steel pipes the collapse whose strengths have been obtained in advance.

(Coefficients)

Meanwhile, the coefficients α,β, ζ, and η in the equations are coefficients that are obtained in advance. A method for computing these coefficients is not particularly limited, and the coefficients can be determined using, for example, the least-square method from errors between the actual measurement values and the predicted values of a plurality of reference steel pipes the collapse whose strengths have been obtained in advance.

In the case of an electric resistance welded steel pipe, Equation 16, Equation 17, Equation 18, Equation 19, Equation 20, and Equation 21 are preferably used instead of Equation 7, Equation 8, Equation 9, Equation 10, Equation 14, and Equation 15.

$F_E(D/t)$, $F_Y(D/t)$, $G_E(\sigma_{CDOS})$, $G_Y(\sigma_{CDOS})$, f(u), and g(D/t) are correction terms of Equation 3 which is the prediction equation. In the collapse strength prediction method according to the present embodiment, Equation 7 may be represented by $$F_E(D/t) = 9.39 \times 10^{-1} + 3.37 \times 10^{-2} \times (D/t) - 3.70 \times 10^{-4} \times (D/t)^2 \quad \text{(Equation 16)}.$$

In addition, Equation 8 may be represented by $$F_Y(D/t) = 1.17 - 1.35 \times 10^{-2} (D/t) - 3.49 \times 10^{-5} \times (D/t)^2 \quad \text{(Equation 17)}.$$

In addition, Equation 9 may be represented by $$G_E(\sigma_{CDOS}) = 9.54(\sigma_{CDOS})^{-2} - 1.85 \times 10 \times (\sigma_{CDOS})^{-1} + 6.41 \times 10^{-1} + 4.57 \times 10^{-5} \times (\sigma_{CDOS}) \quad \text{(Equation 18)}$$

In addition, Equation 10 may be represented by $$G_Y(\sigma_{CDOS}) = 1 \quad \text{(Equation 19)}$$

In addition, Equation 14 may be represented by $$f(u) = 9.39 \times 10^{-1} + 1.11 \times 10^{-2} \times (u) + 2.15 \times 10^{-2} \times (u)^2 \quad \text{(Equation 20)}.$$

In addition, Equations 15 may be represented by $$g(D/t) = 1.08 + 7.06 \times 10^{-8} \times (D/t) + 7.85 \times 10^{-7} \times (D/t)^2 \quad \text{(Equation 21)}.$$

Equation 16 to Equation 21 are modification examples of Equation 7 to Equation 10, Equation 14, and Equation 15 in the case of employing particularly preferred coefficients α,β, ζ, and η.

A preferred value of N in the computation of the coefficients α,β, ζ, and η is 5.

Meanwhile, when Equation 3 is used as the prediction equation, a more highly accurate collapse strength can be predicted. However, the prediction equation is not limited only to Equation 3, and the following prediction equations can also be employed. Meanwhile, in the case of employing the following prediction equations, coefficients of Equation 4 to Equation 15 need to be separately obtained.

As the prediction equation, for example, Equation 23 to Equation 26 described in Publication A (American Petroleum Institute: API BUL 5C3, 1985) can be used.

Equation 23 to Equation 26 are selected depending on the above-described collapse pattern, Equation 23 is a prediction equation in the yield collapse region, Equation 24 is a prediction equation in the plastic collapse region, Equation 25 is a prediction equation in the transition collapse region, and Equation 26 is a prediction equation in the elastic collapse region.

$$P_{Y_p} = 2Y_p\left[\frac{(D/t)-1}{(D/t)^2}\right] \quad \text{(Equation 23)}$$

$$P_P = Y_p\left[\frac{A}{D/t} - B\right] - C \quad \text{(Equation 24)}$$

$$P_T = Y_p\left[\frac{F}{D/t} - G\right] \quad \text{(Equation 25)}$$

$$P_E = \frac{46.95 \times 10^6}{(D/t)((D/t)-1)^2} \quad \text{(Equation 26)}$$

Publication A describes collapse strength prediction equations that are used in the designing of oil countries or collapse patterns relative to D/t by the grade of steel pipes. In the prediction equations according to the present embodiment, the collapse patterns are classified into elastic collapse, transition collapse, plastic collapse, and yield collapse depending on the steel pipe strength and D/t.

An elastic collapse equation is an equation that considers the safety coefficient and imparts a collapse strength of 71.25% of the theoretical solution. In API, the yield collapse is specified as an external pressure at which the inner surface of a steel pipe reaches the yield stress. A plastic collapse equation is derived from the results of approximately 2,500 times of a collapse test of a K55, N80, P110 seamless steel pipe using a regression analysis. A transition collapse equation is built in order to compensate for a D/t range in which the prediction line diagrams of the elastic collapse equation and the plastic collapse equation do not intersect each other.

As the prediction equation, for example, Equation 27 described in Publication B (DET NORSKE VERITAS: Offshore Standard DNV-OS-F101, Submarine Pipelines Systems, 2007.) can be used.

$$(P_C - P_{el})(P_C^2 - P_p^2) = P_C P_{el} P_p u \frac{D}{2} \quad \text{(Equation 27)}$$

In Equation 27, $P_C$ is the collapse strength, $P_{el}$ is the elastic collapse strength, $P_p$ is the plastic collapse strength, u is the ovality, and D is the average outer form.

As the prediction equation, for example, Equation 28 described in Publication C (Toshitaka Tamano, Yasusuke Inoue, and Toshitaro Mimaki, Journal of The Japan $$P_{est} = \frac{1}{2}(P_{EA} + P_{GO}) - \sqrt{\frac{1}{4}(P_{EA} - P_{GO})^2 + P_{EA} P_{GO} H} \quad \text{(Equation 28)}$$

Society for Technology of Plasticity, Vol. 30, No. 338, pp. 385 to 390, 1989.) can be used.

In Equation 28, $P_{est}$ is the collapse strength, $P_{EA}$ is the elastic collapse strength, $P_{GO}$ is the entire surface yield strength, and H is a correction term.

As the prediction equation, for example, Equation 29 described in Publication D (International Organization for Standardization: ISO/DIS 10400, Petroleum and natural gas industries, 2004.) can be used.

$$P_C = p_i + 2p_{yc} P_{ec} / \{(p_{yc} + p_{ec}) + [(p_{yc} - p_{ec})^2 + 4p_{yc} p_{ec} H_t]^{1/2}\} \quad \text{(Equation 29)}$$

In Equation 29, $P_C$ is the collapse strength, $P_i$ is the inner pressure, $P_{yc}$ is the yield collapse strength, $P_{ec}$ is the elastic collapse strength, and $H_t$ is a correction function specified using the ovality, the eccentricity, the residual stress, and the SS curve.

The kinds of steel pipes to which the prediction method of the embodiment can be applied are not particularly limited, and examples thereof include a seamless steel pipe, an electric resistance welded steel pipe, an arc-welded steel pipe, and the like. Meanwhile, the ovality, the eccentricity, and the residual stress in the circumferential direction, which are the collapse strength dominant factors, of the steel pipe can be measured using, for example, the following methods.

Hitherto, the embodiments of the collapse strength prediction method of the present invention have been described; however, evidently, the present invention is not limited only to these embodiments. Meanwhile, in the collapse strength prediction method according to the present embodiment, the order of the respective steps is arbitrary.

EXAMPLES

Hereinafter, experiment examples regarding the collapse strength prediction method according to the present invention will be described.

Experiment Example 1

For steel pipes having a shape shown in Tables 1 to 4, collapse strengths obtained by the finite element analyses (FEA) and predicted collapse strengths estimated using a method of the related art and the prediction method according to the present invention were compared with each other. The values of D/t of the steel pipes were any of 10, 19, 28, 32, or 48.

As the method of the related art, the prediction equation described in Non-Patent Document 1 was used. That is, in all of the comparative examples, a 0.20% proof stress was employed as the collapse dominant proof stress.

Meanwhile, as the prediction method according to the present invention, the prediction equation represented by Equation 3 was used, and, as the collapse dominant proof stress, a 0.50% proof stress was employed in a case in which the value of D/t was 10, a 0.10% proof stress was employed in a case in which the value of D/t was 19, and a 0.05% proof stress was employed in a case in which the value of D/t was 28 to 48. Meanwhile, the Young's moduli of the steel pipes were 205,800 MPa, and the Poisson's ratios were 0.3.

TABLE 1

| No. | D/t | Ovality (%) | Eccentricity (%) | Permanent strain | Collapse dominant proof stress (MPa) | Collapse strength: FEA (psi) | Collapse strength: predicted value (psi) | Error (%) |
|---|---|---|---|---|---|---|---|---|
| Example 1 | 48 | 0.25 | 0.00 | 0.05% | 507 | 640 | 644 | 0.7 |
| Example 2 | 48 | 0.25 | 0.00 | 0.05% | 450 | 632 | 633 | 0.2 |
| Example 3 | 48 | 0.25 | 0.00 | 0.05% | 420 | 629 | 626 | −0.5 |
| Example 4 | 48 | 0.25 | 0.00 | 0.05% | 381 | 621 | 616 | −0.9 |
| Example 5 | 32 | 0.25 | 0.00 | 0.05% | 507 | 2119 | 2081 | −1.8 |
| Example 6 | 32 | 0.25 | 0.00 | 0.05% | 420 | 2016 | 1991 | −1.3 |
| Example 7 | 32 | 0.25 | 0.00 | 0.05% | 381 | 1932 | 1928 | −0.2 |
| Example 8 | 32 | 0.25 | 0.00 | 0.05% | 330 | 1806 | 1805 | 0.0 |
| Example 9 | 28 | 0.25 | 0.00 | 0.05% | 420 | 2833 | 2777 | −2.0 |
| Example 10 | 28 | 0.25 | 0.00 | 0.05% | 381 | 2656 | 2640 | −0.6 |
| Example 11 | 28 | 0.25 | 0.00 | 0.05% | 330 | 2403 | 2398 | −0.2 |
| Example 12 | 19 | 0.25 | 0.00 | 0.10% | 509 | 7023 | 6699 | −4.6 |
| Example 13 | 19 | 0.25 | 0.00 | 0.10% | 456 | 6328 | 6079 | −3.9 |
| Example 14 | 19 | 0.25 | 0.00 | 0.10% | 445 | 5852 | 5946 | 1.6 |
| Example 15 | 19 | 0.25 | 0.00 | 0.10% | 417 | 5509 | 5601 | 1.7 |
| Example 16 | 19 | 0.25 | 0.00 | 0.10% | 372 | 5078 | 5032 | −0.9 |
| Example 17 | 10 | 0.25 | 0.00 | 0.50% | 490 | 14620 | 15047 | 2.9 |

TABLE 1-continued

| No. | D/t | Ovality (%) | Eccentricity (%) | Permanent strain | Collapse dominant proof stress (MPa) | Collapse strength: FEA (psi) | Collapse strength: predicted value (psi) | Error (%) |
|---|---|---|---|---|---|---|---|---|
| Example 18 | 10 | 0.25 | 0.00 | 0.50% | 507 | 15200 | 15563 | 2.4 |
| Example 19 | 10 | 0.25 | 0.00 | 0.50% | 503 | 15214 | 15442 | 1.5 |
| Example 20 | 10 | 0.25 | 0.00 | 0.50% | 488 | 15127 | 14986 | −0.9 |
| Example 21 | 48 | 0.50 | 0.00 | 0.05% | 507 | 621 | 619 | −0.4 |
| Example 22 | 48 | 0.50 | 0.00 | 0.05% | 450 | 612 | 606 | −1.0 |
| Example 23 | 48 | 0.50 | 0.00 | 0.05% | 420 | 604 | 598 | −0.9 |
| Example 24 | 48 | 0.50 | 0.00 | 0.05% | 330 | 573 | 564 | −1.6 |
| Example 25 | 32 | 0.50 | 0.00 | 0.05% | 450 | 1936 | 1907 | −1.5 |
| Example 26 | 31 | 0.50 | 0.00 | 0.05% | 420 | 1871 | 1865 | −0.3 |
| Example 27 | 31 | 0.50 | 0.00 | 0.05% | 381 | 1788 | 1796 | 0.4 |
| Example 28 | 32 | 0.50 | 0.00 | 0.05% | 330 | 1672 | 1675 | 0.2 |
| Example 29 | 28 | 0.50 | 0.00 | 0.05% | 450 | 2741 | 2662 | −2.9 |
| Example 30 | 28 | 0.50 | 0.00 | 0.05% | 420 | 2619 | 2579 | −1.5 |
| Example 31 | 28 | 0.50 | 0.00 | 0.05% | 381 | 2474 | 2450 | −1.0 |
| Example 32 | 28 | 0.50 | 0.00 | 0.05% | 330 | 2270 | 2235 | −1.5 |
| Example 33 | 19 | 0.50 | 0.00 | 0.10% | 509 | 6601 | 6306 | −4.5 |
| Example 34 | 19 | 0.50 | 0.00 | 0.10% | 456 | 6005 | 5758 | −4.1 |
| Example 35 | 19 | 0.50 | 0.00 | 0.10% | 445 | 5623 | 5639 | 0.3 |
| Example 36 | 19 | 0.50 | 0.00 | 0.10% | 417 | 5304 | 5329 | 0.5 |
| Example 37 | 19 | 0.50 | 0.00 | 0.10% | 372 | 4891 | 4811 | −1.6 |
| Example 38 | 10 | 0.50 | 0.00 | 0.50% | 527 | 15287 | 15727 | 2.9 |
| Example 39 | 10 | 0.50 | 0.00 | 0.50% | 490 | 14264 | 14644 | 2.7 |

TABLE 2

| No. | D/t | Ovality (%) | Eccentricity (%) | Permanent strain | Collapse dominant proof stress (MPa) | Collapse strength: FEA (psi) | Collapse strength: predicted value (psi) | Error (%) |
|---|---|---|---|---|---|---|---|---|
| Example 40 | 10 | 0.50 | 0.00 | 0.50% | 507 | 14837 | 15142 | 2.1 |
| Example 41 | 10 | 0.50 | 0.00 | 0.50% | 503 | 14823 | 15025 | 1.4 |
| Example 42 | 10 | 0.50 | 0.00 | 0.50% | 488 | 14721 | 14585 | −0.9 |
| Example 43 | 48 | 1.00 | 0.00 | 0.05% | 507 | 582 | 577 | −0.7 |
| Example 44 | 48 | 1.00 | 0.00 | 0.05% | 450 | 570 | 562 | −1.3 |
| Example 45 | 48 | 1.00 | 0.00 | 0.05% | 381 | 541 | 538 | −0.5 |
| Example 46 | 48 | 1.00 | 0.00 | 0.05% | 330 | 521 | 514 | −1.2 |
| Example 47 | 32 | 1.00 | 0.00 | 0.05% | 507 | 1801 | 1805 | 0.2 |
| Example 48 | 32 | 1.00 | 0.00 | 0.05% | 450 | 1732 | 1734 | 0.1 |
| Example 49 | 31 | 1.00 | 0.00 | 0.05% | 420 | 1677 | 1689 | 0.8 |
| Example 50 | 31 | 1.00 | 0.00 | 0.05% | 381 | 1610 | 1620 | 0.6 |
| Example 51 | 32 | 1.00 | 0.00 | 0.05% | 330 | 1503 | 1507 | 0.3 |
| Example 52 | 28 | 1.00 | 0.00 | 0.05% | 507 | 2547 | 2525 | −0.9 |
| Example 53 | 28 | 1.00 | 0.00 | 0.05% | 450 | 2429 | 2400 | −1.2 |
| Example 54 | 28 | 1.00 | 0.00 | 0.05% | 420 | 2335 | 2321 | −0.6 |
| Example 55 | 28 | 1.00 | 0.00 | 0.05% | 381 | 2219 | 2203 | −0.7 |
| Example 56 | 28 | 1.00 | 0.00 | 0.05% | 330 | 2060 | 2017 | −2.1 |
| Example 57 | 19 | 1.00 | 0.00 | 0.10% | 509 | 5974 | 5740 | −3.9 |
| Example 58 | 19 | 1.00 | 0.00 | 0.10% | 456 | 5482 | 5276 | −3.8 |
| Example 59 | 19 | 1.00 | 0.00 | 0.10% | 445 | 5226 | 5174 | −1.0 |
| Example 60 | 19 | 1.00 | 0.00 | 0.10% | 417 | 4965 | 4908 | −1.1 |
| Example 61 | 19 | 1.00 | 0.00 | 0.10% | 372 | 4598 | 4458 | −3.0 |
| Example 62 | 10 | 1.00 | 0.00 | 0.50% | 527 | 15069 | 14976 | −0.6 |
| Example 63 | 10 | 1.00 | 0.00 | 0.50% | 490 | 13898 | 13961 | 0.5 |
| Example 64 | 10 | 1.00 | 0.00 | 0.50% | 507 | 14357 | 14428 | 0.5 |
| Example 65 | 10 | 1.00 | 0.00 | 0.50% | 503 | 14330 | 14319 | −0.1 |
| Example 66 | 10 | 1.00 | 0.00 | 0.50% | 488 | 14170 | 13906 | −1.9 |
| Example 67 | 10 | 1.00 | 0.00 | 0.50% | 668 | 19000 | 18778 | −1.2 |
| Example 68 | 10 | 1.00 | 0.00 | 0.50% | 771 | 21669 | 21488 | −0.8 |
| Example 69 | 10 | 1.00 | 0.00 | 0.50% | 722 | 20421 | 20207 | −1.1 |
| Example 70 | 10 | 5.00 | 0.00 | 0.50% | 503 | 11771 | 11146 | −5.3 |
| Example 71 | 19 | 5.00 | 0.00 | 0.10% | 417 | 3437 | 3392 | −1.3 |
| Example 72 | 32 | 3.00 | 0.00 | 0.05% | 381 | 1240 | 1281 | 3.2 |
| Example 73 | 48 | 5.00 | 0.00 | 0.05% | 381 | 362 | 371 | 2.5 |
| Example 74 | 31 | 0.20 | 0.25 | 0.05% | 646 | 2121 | 2098 | −1.1 |
| Example 75 | 32 | 0.15 | 0.25 | 0.05% | 646 | 2115 | 2109 | −0.3 |
| Example 76 | 32 | 0.20 | 0.20 | 0.05% | 646 | 2149 | 2106 | −2.0 |
| Example 77 | 32 | 0.20 | 0.40 | 0.05% | 357 | 1758 | 1745 | −0.7 |

TABLE 3

| No. | D/t | Ovality (%) | Eccentricity (%) | Permanent strain | Collapse dominant proof stress (MPa) | Collapse strength: FEA (psi) | Collapse strength: predicted value (psi) | Error (%) |
|---|---|---|---|---|---|---|---|---|
| Comparative Example 1 | 48 | 0.25 | 0 | 0.05% | 509 | 640 | 605 | −5.5 |
| Comparative Example 2 | 48 | 0.25 | 0 | 0.05% | 462 | 632 | 604 | −4.4 |
| Comparative Example 3 | 48 | 0.25 | 0 | 0.05% | 472 | 629 | 604 | −4.0 |
| Comparative Example 4 | 48 | 0.25 | 0 | 0.05% | 456 | 621 | 604 | −2.8 |
| Comparative Example 5 | 32 | 0.25 | 0 | 0.05% | 509 | 2119 | 2056 | −3.0 |
| Comparative Example 6 | 32 | 0.25 | 0 | 0.05% | 472 | 2016 | 2052 | 1.8 |
| Comparative Example 7 | 32 | 0.25 | 0 | 0.05% | 456 | 1932 | 2049 | 6.1 |
| Comparative Example 8 | 32 | 0.25 | 0 | 0.05% | 420 | 1806 | 2042 | 13.1 |
| Comparative Example 9 | 28 | 0.25 | 0 | 0.05% | 472 | 2833 | 3043 | 7.4 |
| Comparative Example 10 | 28 | 0.25 | 0 | 0.05% | 456 | 2656 | 3034 | 14.2 |
| Comparative Example 11 | 28 | 0.25 | 0 | 0.05% | 420 | 2403 | 3007 | 25.1 |
| Comparative Example 12 | 19 | 0.25 | 0 | 0.10% | 509 | 7023 | 7435 | 5.9 |
| Comparative Example 13 | 19 | 0.25 | 0 | 0.10% | 462 | 6328 | 6825 | 7.9 |
| Comparative Example 14 | 19 | 0.25 | 0 | 0.10% | 472 | 5852 | 6958 | 18.9 |
| Comparative Example 15 | 19 | 0.25 | 0 | 0.10% | 456 | 5509 | 6745 | 22.4 |
| Comparative Example 16 | 19 | 0.25 | 0 | 0.10% | 420 | 5078 | 6252 | 23.1 |
| Comparative Example 17 | 10 | 0.25 | 0 | 0.50% | 462 | 14620 | 13690 | −6.4 |
| Comparative Example 18 | 10 | 0.25 | 0 | 0.50% | 472 | 15200 | 13985 | −8.0 |
| Comparative Example 19 | 10 | 0.25 | 0 | 0.50% | 456 | 15214 | 13513 | −11.2 |
| Comparative Example 20 | 10 | 0.25 | 0 | 0.50% | 420 | 15127 | 12451 | −17.7 |
| Comparative Example 21 | 48 | 0.5 | 0 | 0.05% | 509 | 621 | 589 | −5.1 |
| Comparative Example 22 | 48 | 0.5 | 0 | 0.05% | 462 | 612 | 589 | −3.9 |
| Comparative Example 23 | 48 | 0.5 | 0 | 0.05% | 472 | 604 | 589 | −2.5 |
| Comparative Example 24 | 48 | 0.5 | 0 | 0.05% | 420 | 573 | 588 | 2.6 |
| Comparative Example 25 | 32 | 0.5 | 0 | 0.05% | 462 | 1936 | 1972 | 1.9 |
| Comparative Example 26 | 32 | 0.5 | 0 | 0.05% | 472 | 1871 | 1975 | 5.6 |
| Comparative Example 27 | 32 | 0.5 | 0 | 0.05% | 456 | 1788 | 1971 | 10.2 |
| Comparative Example 28 | 32 | 0.5 | 0 | 0.05% | 420 | 1672 | 1958 | 17.1 |
| Comparative Example 29 | 28 | 0.5 | 0 | 0.05% | 462 | 2741 | 2890 | 5.4 |
| Comparative Example 30 | 28 | 0.5 | 0 | 0.05% | 472 | 2619 | 2899 | 10.7 |
| Comparative Example 31 | 28 | 0.5 | 0 | 0.05% | 456 | 2474 | 2885 | 16.6 |
| Comparative Example 32 | 28 | 0.5 | 0 | 0.05% | 420 | 2270 | 2846 | 25.4 |
| Comparative Example 33 | 19 | 0.5 | 0 | 0.10% | 509 | 6601 | 7024 | 6.4 |
| Comparative Example 34 | 19 | 0.5 | 0 | 0.10% | 462 | 6005 | 6485 | 8.0 |
| Comparative Example 35 | 19 | 0.5 | 0 | 0.10% | 472 | 5623 | 6604 | 17.4 |
| Comparative Example 36 | 19 | 0.5 | 0 | 0.10% | 456 | 5304 | 6414 | 20.9 |
| Comparative Example 37 | 19 | 0.5 | 0 | 0.10% | 420 | 4891 | 5970 | 22.1 |
| Comparative Example 38 | 10 | 0.5 | 0 | 0.50% | 509 | 15287 | 14696 | −3.9 |
| Comparative Example 39 | 10 | 0.5 | 0 | 0.50% | 462 | 14264 | 13353 | −6.4 |

TABLE 4

| No. | D/t | Ovality (%) | Eccentricity (%) | Permanent strain | Collapse dominant proof stress (MPa) | Collapse strength: FEA (psi) | Collapse strength: predicted value (psi) | Error (%) |
|---|---|---|---|---|---|---|---|---|
| Comparative Example 40 | 10 | 0.5 | 0 | 0.50% | 472 | 14837 | 13639 | −8.1 |
| Comparative Example 41 | 10 | 0.5 | 0 | 0.50% | 456 | 14823 | 13181 | −11.1 |
| Comparative Example 42 | 10 | 0.5 | 0 | 0.50% | 420 | 14721 | 12149 | −17.5 |
| Comparative Example 43 | 48 | 1 | 0 | 0.05% | 509 | 582 | 559 | −3.9 |
| Comparative Example 44 | 48 | 1 | 0 | 0.05% | 462 | 570 | 558 | −2.1 |
| Comparative Example 45 | 48 | 1 | 0 | 0.05% | 456 | 541 | 558 | 3.1 |
| Comparative Example 46 | 48 | 1 | 0 | 0.05% | 420 | 521 | 556 | 6.8 |
| Comparative Example 47 | 32 | 1 | 0 | 0.05% | 509 | 1801 | 1848 | 2.6 |
| Comparative Example 48 | 32 | 1 | 0 | 0.05% | 462 | 1732 | 1830 | 5.7 |
| Comparative Example 49 | 32 | 1 | 0 | 0.05% | 472 | 1677 | 1835 | 9.4 |
| Comparative Example 50 | 32 | 1 | 0 | 0.05% | 456 | 1610 | 1828 | 13.5 |
| Comparative Example 51 | 32 | 1 | 0 | 0.05% | 420 | 1503 | 1809 | 20.4 |
| Comparative Example 52 | 28 | 1 | 0 | 0.05% | 509 | 2547 | 2689 | 5.6 |
| Comparative Example 53 | 28 | 1 | 0 | 0.05% | 462 | 2429 | 2642 | 8.8 |
| Comparative Example 54 | 28 | 1 | 0 | 0.05% | 472 | 2335 | 2653 | 13.6 |
| Comparative Example 55 | 28 | 1 | 0 | 0.05% | 456 | 2219 | 2635 | 18.7 |
| Comparative Example 56 | 28 | 1 | 0 | 0.05% | 420 | 2060 | 2585 | 25.5 |
| Comparative Example 57 | 19 | 1 | 0 | 0.10% | 509 | 5974 | 6369 | 6.6 |
| Comparative Example 58 | 19 | 1 | 0 | 0.10% | 462 | 5482 | 5918 | 8.0 |
| Comparative Example 59 | 19 | 1 | 0 | 0.10% | 472 | 5226 | 6018 | 15.2 |
| Comparative Example 60 | 19 | 1 | 0 | 0.10% | 456 | 4965 | 5858 | 18.0 |
| Comparative Example 61 | 19 | 1 | 0 | 0.10% | 420 | 4598 | 5481 | 19.2 |
| Comparative Example 62 | 10 | 1 | 0 | 0.50% | 509 | 15069 | 13950 | −7.4 |
| Comparative Example 63 | 10 | 1 | 0 | 0.50% | 462 | 13898 | 12687 | −8.7 |

TABLE 4-continued

| No. | D/t | Ovality (%) | Eccentricity (%) | Permanent strain | Collapse dominant proof stress (MPa) | Collapse strength: FEA (psi) | Collapse strength: predicted value (psi) | Error (%) |
|---|---|---|---|---|---|---|---|---|
| Comparative Example 64 | 10 | 1 | 0 | 0.50% | 472 | 14357 | 12956 | −9.8 |
| Comparative Example 65 | 10 | 1 | 0 | 0.50% | 456 | 14330 | 12525 | −12.6 |
| Comparative Example 66 | 10 | 1 | 0 | 0.50% | 420 | 14170 | 11554 | −18.5 |
| Comparative Example 67 | 10 | 1 | 0 | 0.50% | 623 | 19000 | 16986 | −10.6 |
| Comparative Example 68 | 10 | 1 | 0 | 0.50% | 745 | 21669 | 20191 | −6.8 |
| Comparative Example 69 | 10 | 1 | 0 | 0.50% | 703 | 20421 | 19093 | −6.5 |
| Comparative Example 70 | 10 | 5 | 0 | 0.50% | 456 | 11771 | 7669 | −34.9 |
| Comparative Example 71 | 19 | 5 | 0 | 0.10% | 456 | 3437 | 3082 | −10.3 |
| Comparative Example 72 | 32 | 3 | 0 | 0.05% | 456 | 1240 | 1366 | 10.2 |
| Comparative Example 73 | 48 | 5 | 0 | 0.05% | 456 | 362 | 335 | −7.3 |
| Comparative Example 74 | 32 | 0.2 | 0.25 | 0.05% | 646 | 2121 | 1936 | −8.7 |
| Comparative Example 75 | 32 | 0.15 | 0.25 | 0.05% | 646 | 2115 | 1939 | −8.3 |
| Comparative Example 76 | 32 | 0.2 | 0.2 | 0.05% | 646 | 2149 | 1941 | −9.7 |
| Comparative Example 77 | 32 | 0.2 | 0.4 | 0.05% | 357 | 1758 | 1810 | 3.0 |

TABLE 5

| i | 1 | 2 | 3 | 4 | 5 |
|---|---|---|---|---|---|
| $\alpha^E_i$ | 0 | 0 | $9.39 \times 10^{-1}$ | $3.37 \times 10^{-2}$ | $-3.70 \times 10^{-4}$ |
| $\alpha^Y_i$ | 0 | 0 | 1.17 | $-1.35 \times 10^{-2}$ | $-3.49 \times 10^{-5}$ |
| $\beta^E_i$ | 9.54 | $-1.85 \times 10$ | $6.41 \times 10^{-1}$ | $4.57 \times 10^{-5}$ | 0 |
| $\beta^Y_i$ | 0 | 0 | 1.00 | 0 | 0 |
| $\xi_i$ | $9.39 \times 10^{-1}$ | $1.11 \times 10^{-2}$ | $2.15 \times 10^{-2}$ | — | — |
| $\eta_i$ | 1.08 | $7.06 \times 10^{-8}$ | $7.85 \times 10^{-7}$ | — | — |

TABLE 6

| Coefficients | $h_\alpha$ | $h_\beta$ | $h_\gamma$ |
|---|---|---|---|
| Value | $1.02 \times 10^{-1}$ | $1.40 \times 10^{-3}$ | $-2.92 \times 10^{-2}$ |

In addition, coefficients $\alpha, \beta, \zeta, \eta, h_\alpha, h_\beta$, and $h_\gamma$ that were used in the prediction equation were computed using the least-square method so that the error between the collapse strength obtained by FEA and the predicted collapse strength that was obtained using the prediction equation that is used in the method of the present invention was minimized for 45 specimens having D/t in a range of 10 to 48. The computation results of the respective coefficients are shown in Table 5 and Table 6.

Figure 2:
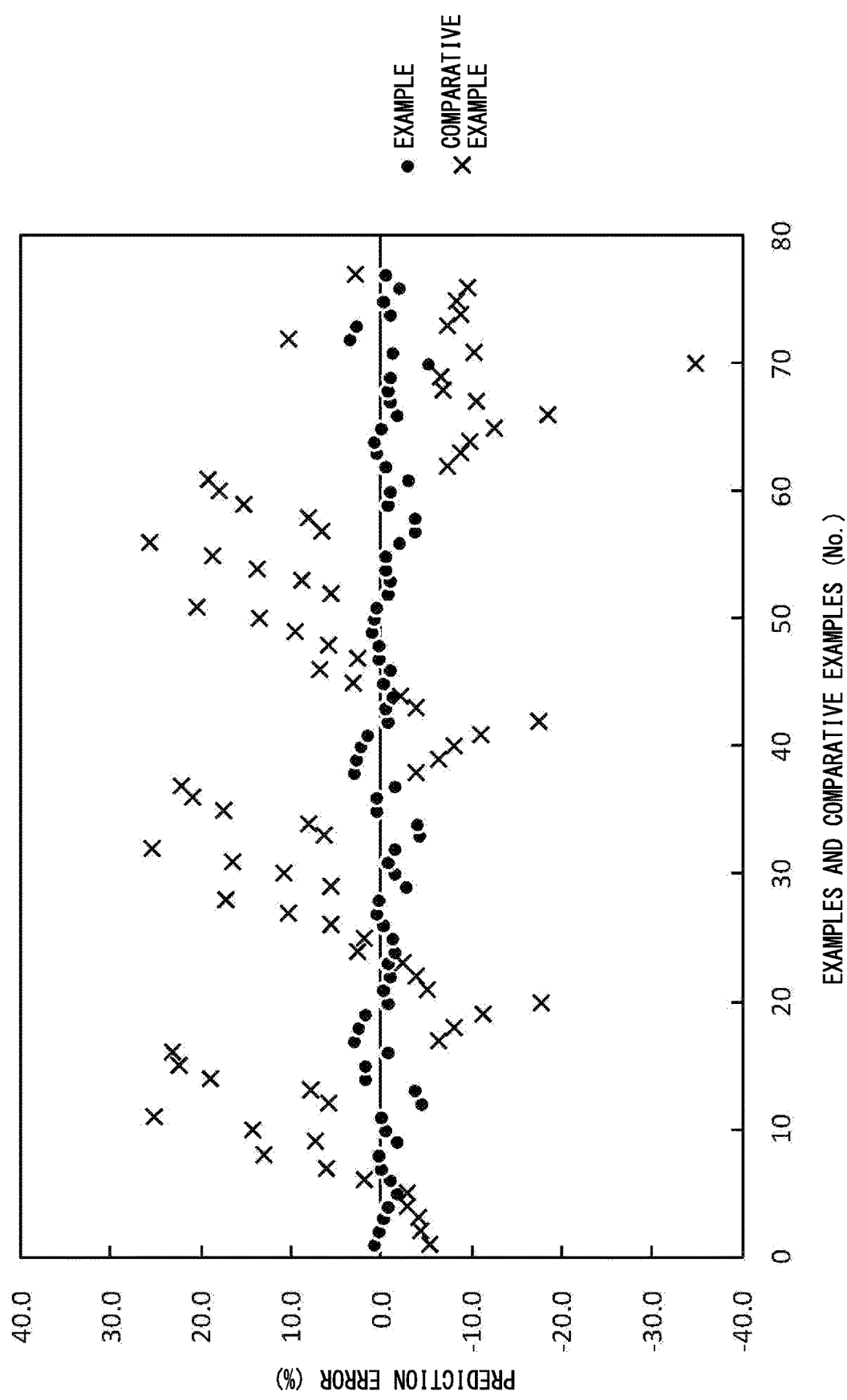
FIG. 2 is a view for showing comparison between prediction errors in the case of using a prediction method according to an embodiment of the present invention and in the case of using a prediction method of the related art.

As shown in Table 1 to Table 4 and shown in FIG. 2, significantly-improved results were obtained regarding prediction errors in the case of using the prediction method according to the present invention compared with the prediction method of the related art.

Meanwhile, FEA is an extremely highly accurate calculation method relative to actual measurement values since a variety of factors are taken into account. It is extremely difficult to carry out the collapse test on a steel pipe having a large diameter, and thus, in the present experiment example, the collapse strengths obtained by FEA and the predicted collapse strengths estimated using the method of the related art and the prediction method according to the present invention were compared with one another.

Figure 3:
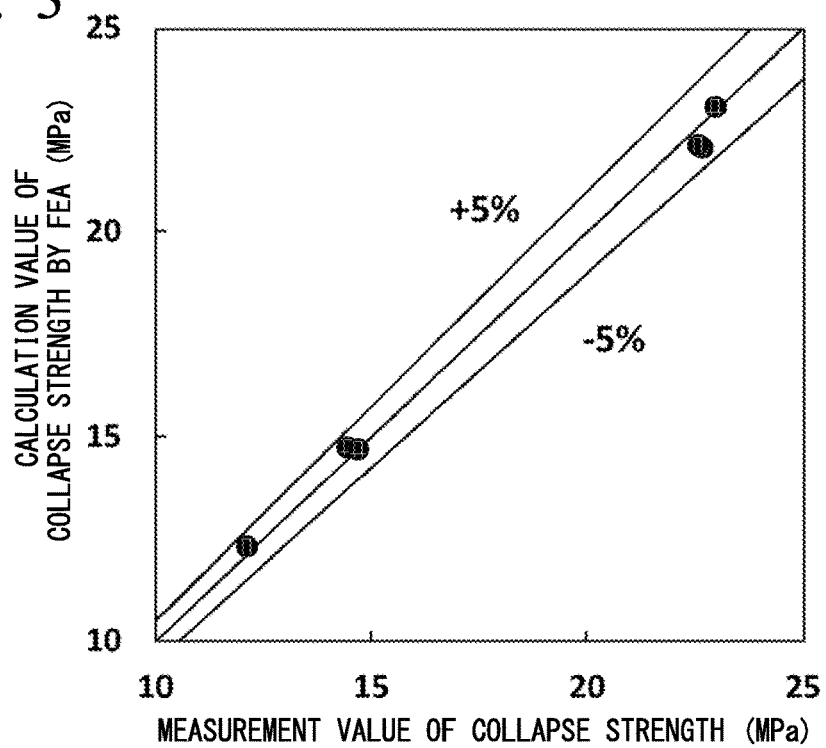
FIG. 3 is a view for comparing collapse strengths obtained by a collapse test and FEA respectively.

In order to examine the adequacy of the collapse strength obtained by FEA, the collapse strength was compared with the results of the collapse test for six specimens. The results are shown in FIG. 3. It is found that, as shown in FIG. 3, the results of FEA are capable of accurately reproducing the results of the collapse test.

In addition, in Table 7, for test specimens A to C, the collapse strengths by FEA and the experimental values of the collapse strength are compared with each other. In FE model 1, collapse strengths calculated on the basis of the stress-strain curves at a seam portion and individual portions 45°, 90°, 135°, and 180° away from the seam portion in a cross section perpendicular to the longitudinal direction of the steel pipe are shown. In FE model 2, collapse strengths calculated on the basis of the stress-strain curves based on the average values of the seam portion and the individual portions 45°, 90°, 135°, and 180° away from the seam portion in the cross section perpendicular to the longitudinal direction of the steel pipe are shown.

TABLE 7

| Test specimen | Dimensions (mm) | | | | Ovality (%) | Eccentricity (%) | Collapse strength (psi) | | | | |
|---|---|---|---|---|---|---|---|---|---|---|---|
| | Outer diameter | Thickness | Length | D/t | | | FEA | | Experimental values | | |
| | | | | | | | FE model 1 | FE model 2 | 1 | 2 | 3 |
| Steel pipe A | 406.4 | 12.5 | 4060.0 | 32.61 | 0.37 | 0.81 | 1780 | 1777 | 1732 | 1766 | 1788 |
| Steel pipe B | 406.4 | 12.5 | 4060.0 | 32.66 | 0.13 | 1.02 | 2132 | 2128 | 2089 | 2115 | 2086 |
| Steel pipe C | 406.4 | 12.5 | 4060.0 | 32.25 | 0.22 | 0.27 | 2121 | 2125 | 2121 | 2115 | 2149 |

As shown in Table 7, the calculation results of the collapse strength by FEA are capable of accurately reproducing the results of the actual collapse test.

Experiment Example 2

Figure 4:
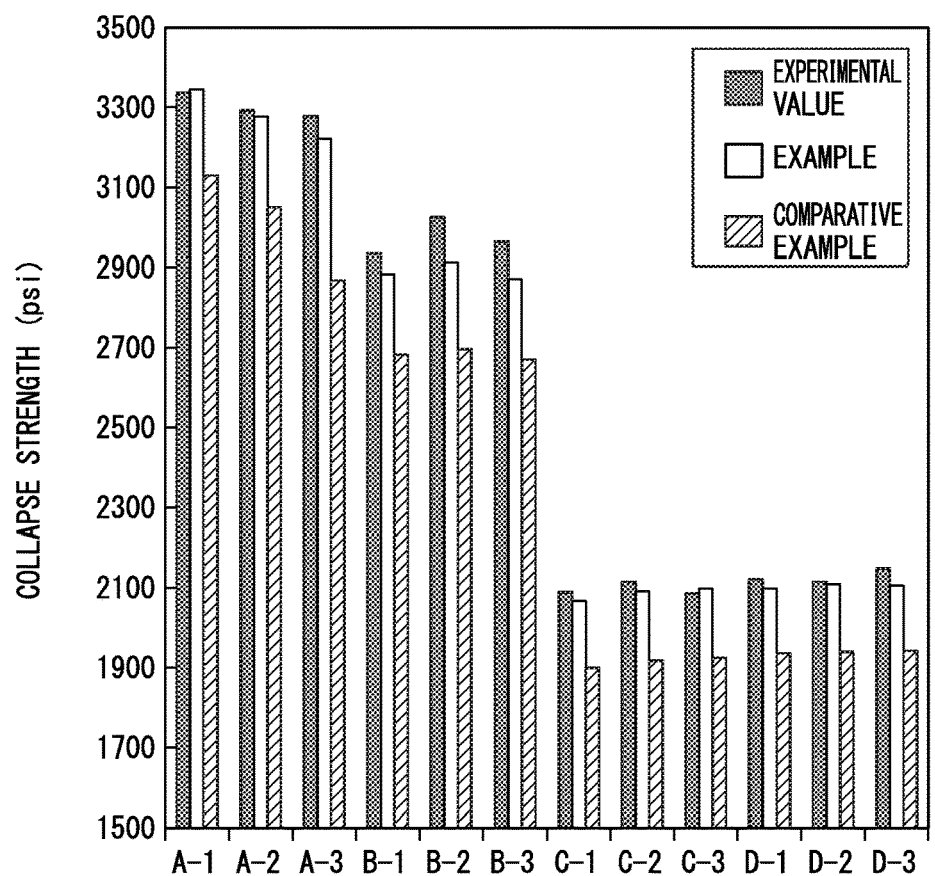
FIG. 4 is a view for showing comparison of examples (a collapse strength prediction method according to the present invention) and comparative examples (a collapse strength prediction method using a technique of the related art) relative to experimental values of a collapse strength.

FIG. 4 shows comparative graphs of the predicted values (examples) obtained using the collapse strength prediction method according to the present invention and the predicted values (comparative examples) obtained using the prediction equation of the related art relative to the experimental values of the collapse strength of Specimens A-1 to D-3.

As is clear from the results, the collapse strength prediction method according to the present invention is more accurate than the predicted values obtained using the prediction equation of the related art.

INDUSTRIAL APPLICABILITY

According to the collapse strength prediction method according to the invention of the present application, it is possible to provide a method which is applicable to steel pipes having a variety of dimensions, that is, a variety of outer diameters and thicknesses and is capable of accurately predicting collapse strengths.

The invention claimed is:

1. A collapse strength prediction method for predicting a collapse strength of a steel pipe, the method comprising:
   deriving a prediction equation indicating a relationship among D/t obtained by dividing an outer diameter D (mm) by a thickness t (mm), material characteristics, a collapse strength dominant factor, a collapse dominant proof stress, and a predicted collapse strength of the steel pipe using a plurality of reference steel pipes collapse whose strengths have been obtained in advance;
   obtaining D/t obtained by dividing an outer diameter D (mm) by a thickness t (mm), material characteristics, and a collapse strength dominant factor of a steel pipe that is an evaluation subject;
   obtaining a compressive stress-strain curve in a circumferential direction of the steel pipe that is the evaluation subject;
   obtaining a stress that causes a permanent strain to be generated in the steel pipe that is the evaluation subject as the collapse dominant proof stress on the basis of the compressive stress-strain curve; and
   computing the predicted collapse strength of the steel pipe that is the evaluation subject from the D/t, the material characteristics, the collapse strength dominant factor, and the collapse dominant proof stress, which have been obtained, on the basis of the prediction equation,
   wherein the permanent strain is set according to a value of the D/t of the steel pipe that is the evaluation subject.

2. The collapse strength prediction method according to claim 1,
   wherein the collapse dominant proof stress is a 0.50% proof stress in a case in which the value of D/t of the steel pipe that is the evaluation subject is in a yield collapse region, is a 0.10% proof stress in a case in which the value of D/t is in a plastic collapse region, and is 0.05% proof stress in a case in which the value of D/t is in a transition collapse region or an elastic collapse region.

3. The collapse strength prediction method according to claim 1,
   wherein the collapse dominant proof stress is a 0.50% proof stress in a case in which the value of D/t of the steel pipe that is the evaluation subject is 10, is a 0.10% proof stress in a case in which the value of D/t is 19, is a 0.05% proof stress in a case in which the value of D/t is 28 to 48, is obtained by interpolation calculation of the 0.50% proof stress and the 0.10% proof stress in a case in which the value of D/t is more than 10 and less than 19, and is obtained by interpolation calculation of the 0.10% proof stress and the 0.05% proof stress in a case in which the value of D/t is more than 19 and less than 28.

4. The collapse strength prediction method according to claim 1,
   wherein the permanent strain is represented by Equation 1 or Equation 2,
   in the case of D/t≤28:
   $$CDOS\ (\%) = \exp(5.522) \times (D/t)^{-2.719+0.02} \quad \text{(Equation 1), and}$$
   in the case of D/t>28:
   $$CDOS\ (\%) = 0.05 \quad \text{(Equation 2).}$$

5. The collapse strength prediction method according to claim 1,
   wherein the material characteristics include a Young's modulus and a Poisson's ratio of the steel pipe that is the evaluation subject; and
   the collapse strength dominant factor includes one or more selected from an ovality, an eccentricity, and a residual stress in the circumferential direction of the steel pipe.

6. The collapse strength prediction method according to claim 2,
   wherein the material characteristics include a Young's modulus and a Poisson's ratio of the steel pipe that is the evaluation subject; and
   the collapse strength dominant factor includes one or more selected from an ovality, an eccentricity, and a residual stress in the circumferential direction of the steel pipe.

7. The collapse strength prediction method according to claim 3,
   wherein the material characteristics include a Young's modulus and a Poisson's ratio of the steel pipe that is the evaluation subject; and
   the collapse strength dominant factor includes one or more selected from an ovality, an eccentricity, and a residual stress in the circumferential direction of the steel pipe.

8. The collapse strength prediction method according to claim 4,
   wherein the material characteristics include a Young's modulus and a Poisson's ratio of the steel pipe that is the evaluation subject; and
   the collapse strength dominant factor includes one or more selected from an ovality, an eccentricity, and a residual stress in the circumferential direction of the steel pipe.

9. The collapse strength prediction method according to claim 5,
   wherein the prediction equation is represented by Equation 3,
   $$P_c = \gamma(0.5(P_E + P_Y) - \sqrt{0.25(P_E - P_Y)^2 + P_E P_Y H}) \quad \text{(Equation 3)}$$
   where, $P_c$ in Equation 3 is the predicted collapse strength, $P_E$ and $P_Y$ are an elastic collapse strength and an entire surface yield strength respectively, and H and γ are correction terms and are computed using Equation 4 to Equation 15, provided that in Equation 4 to Equation 15, E is the Young's modulus, v is the Poisson's ratio, u is the ovality represented by Equation 11, e is the eccentricity represented by Equation 12, $\sigma_{R0}$ is the residual stress in the circumferential direction, $\sigma_{CDOS}$ is the collapse dominant proof stress, and values represented by $h_\alpha$, $h_\beta$, $h_\gamma$, $\alpha,\beta$, $\zeta$, and $\eta$ are coefficients that are obtained in advance, $$P_E = 2\left(\frac{E}{1-v^2}\right)\left(\frac{1}{D/t(D/t-1)^2}\right)F_E(D/t)G_E(\sigma_{CDOS}) \quad \text{(Equation 4)}$$

$$P_Y = 2\sigma_{CDOS}\frac{D/t-1}{(D/t)^2}\left[1+\frac{1.47}{D/t-1}\right]F_Y(D/t)G_Y(\sigma_{CDOS}) \quad \text{(Equation 5)}$$

$$H = h_\alpha u(\%) + h_\beta e(\%) + h_\gamma\left(\frac{\sigma_{R\theta}}{\sigma_{CDOS}}\right) \quad \text{(Equation 6)}$$

$$F_E(D/t) = \sum_{i=1}^{5}\alpha_i^E(D/t)^{i-3} \quad \text{(Equation 7)}$$

$$F_Y(D/t) = \sum_{i=1}^{5}\alpha_i^Y(D/t)^{i-3} \quad \text{(Equation 8)}$$

$$G_E(\sigma_{CDOS}) = \sum_{i=1}^{5}\beta_i^E(\sigma_{CDOS})^{i-3} \quad \text{(Equation 9)}$$

$$G_Y(\sigma_{CDOS}) = \sum_{i=1}^{5}\beta_i^Y(\sigma_{CDOS})^{i-3} \quad \text{(Equation 10)}$$

ovality $u$ (%) = (maximum outer diameter − minimum outer diameter)/ average outer diameter × 100 (Equation 11)

eccentricity $e$ (%) = (maximum thickness − minimum thickness)/ average thickness × 100 (Equation 12)

$$\gamma = F(u, D/t) - f(u)g(D/t) \quad \text{(Equation 13)}$$

$$f(u) = \sum_{i=1}^{3}\xi_i(u)^{i-1} \quad \text{(Equation 14)}$$

$$g(D/t) = \sum_{i=1}^{3}\eta_i(D/t)^{i-1} \quad \text{(Equation 15)}$$

10. The collapse strength prediction method according to claim 6,
wherein the prediction equation is represented by Equation 3, $$P_c = \gamma(0.5(P_E+P_Y) - \sqrt{0.25(P_E-P_Y)^2 + P_E P_Y H}) \quad \text{(Equation 3)}$$

where, $P_c$ in Equation 3 is the predicted collapse strength, $P_E$ and $P_Y$ are an elastic collapse strength and an entire surface yield strength respectively, and H and γ are correction terms and are computed using Equation 4 to Equation 15, provided that in Equation 4 to Equation 15, E is the Young's modulus, v is the Poisson's ratio, u is the ovality represented by Equation 11, e is the eccentricity represented by Equation 12, $\sigma_{R0}$ is the residual stress in the circumferential direction, $\sigma_{CDOS}$ is the collapse dominant proof stress, and values represented by $h_\alpha$, $h_\beta$, $h_\gamma$, $\alpha,\beta$, $\zeta$, and $\eta$ are coefficients that are obtained in advance, $$P_E = 2\left(\frac{E}{1-v^2}\right)\left(\frac{1}{D/t(D/t-1)^2}\right)F_E(D/t)G_E(\sigma_{CDOS}) \quad \text{(Equation 4)}$$

$$P_Y = 2\sigma_{CDOS}\frac{D/t-1}{(D/t)^2}\left[1+\frac{1.47}{D/t-1}\right]F_Y(D/t)G_Y(\sigma_{CDOS}) \quad \text{(Equation 5)}$$

$$H = h_\alpha u(\%) + h_\beta e(\%) + h_\gamma\left(\frac{\sigma_{R\theta}}{\sigma_{CDOS}}\right) \quad \text{(Equation 6)}$$

$$F_E(D/t) = \sum_{i=1}^{5}\alpha_i^E(D/t)^{i-3} \quad \text{(Equation 7)}$$

$$F_Y(D/t) = \sum_{i=1}^{5}\alpha_i^Y(D/t)^{i-3} \quad \text{(Equation 8)}$$

$$G_E(\sigma_{CDOS}) = \sum_{i=1}^{5}\beta_i^E(\sigma_{CDOS})^{i-3} \quad \text{(Equation 9)}$$

$$G_Y(\sigma_{CDOS}) = \sum_{i=1}^{5}\beta_i^Y(\sigma_{CDOS})^{i-3} \quad \text{(Equation 10)}$$

ovality $u$ (%) = (maximum outer diameter − minimum outer diameter)/ average outer diameter × 100 (Equation 11)

eccentricity $e$ (%) = (maximum thickness − minimum thickness)/ average thickness × 100 (Equation 12)

$$\gamma = F(u, D/t) - f(u)g(D/t) \quad \text{(Equation 13)}$$

$$f(u) = \sum_{i=1}^{3}\xi_i(u)^{i-1} \quad \text{(Equation 14)}$$

$$g(D/t) = \sum_{i=1}^{3}\eta_i(D/t)^{i-1} \quad \text{(Equation 15)}$$

11. The collapse strength prediction method according to claim 7,
wherein the prediction equation is represented by Equation 3, $$P_c = \gamma(0.5(P_E+P_Y) - \sqrt{0.25(P_E-P_Y)^2 + P_E P_Y H}) \quad \text{(Equation 3)}$$

where, $P_c$ in Equation 3 is the predicted collapse strength, $P_E$ and $P_Y$ are an elastic collapse strength and an entire surface yield strength respectively, and H and γ are correction terms and are computed using Equation 4 to Equation 15, provided that in Equation 4 to Equation 15, E is the Young's modulus, v is the Poisson's ratio, u is the ovality represented by Equation 11, e is the eccentricity represented by Equation 12, $\sigma_{R0}$ is the residual stress in the circumferential direction, $\sigma_{CDOS}$ is the collapse dominant proof stress, and values represented by $h_\alpha$, $h_\beta$, $h_\gamma$, $\alpha,\beta$, $\zeta$, and $\eta$ are coefficients that are obtained in advance, $$P_E = 2\left(\frac{E}{1-v^2}\right)\left(\frac{1}{D/t(D/t-1)^2}\right)F_E(D/t)G_E(\sigma_{CDOS}) \quad \text{(Equation 4)}$$

$$P_Y = 2\sigma_{CDOS}\frac{D/t-1}{(D/t)^2}\left[1+\frac{1.47}{D/t-1}\right]F_Y(D/t)G_Y(\sigma_{CDOS}) \quad \text{(Equation 5)}$$

$$H = h_\alpha u(\%) + h_\beta e(\%) + h_\gamma\left(\frac{\sigma_{R\theta}}{\sigma_{CDOS}}\right) \quad \text{(Equation 6)}$$

-continued $$F_E(D/t) = \sum_{i=1}^{5} \alpha_i^E (D/t)^{i-3} \quad \text{(Equation 7)}$$

$$F_Y(D/t) = \sum_{i=1}^{5} \alpha_i^Y (D/t)^{i-3} \quad \text{(Equation 8)}$$

$$G_E(\sigma_{CDOS}) = \sum_{i=1}^{5} \beta_i^E (\sigma_{CDOS})^{i-3} \quad \text{(Equation 9)}$$

$$G_Y(\sigma_{CDOS}) = \sum_{i=1}^{5} \beta_i^Y (\sigma_{CDOS})^{i-3} \quad \text{(Equation 10)}$$

ovality $u$ (%) = (Equation 11)
(maximum outer diameter − minimum outer diameter)/ average outer diameter × 100 eccentricity $e$ (%) = (Equation 12)
(maximum thickness − minimum thickness)/ average thickness × 100

$$\gamma = F(u, D/t) - f(u)g(D/t) \quad \text{(Equation 13)}$$

$$f(u) = \sum_{i=1}^{3} \xi_i (u)^{i-1} \quad \text{(Equation 14)}$$

$$g(D/t) = \sum_{i=1}^{3} \eta_i (D/t)^{i-1} \quad \text{(Equation 15)}$$

12. The collapse strength prediction method according to claim 8,
wherein the prediction equation is represented by Equation 3, $$P_c = \gamma(0.5(P_E+P_Y) - \sqrt{0.25(P_E-P_Y)^2 + P_E P_Y H}) \quad \text{(Equation 3)}$$

where, $P_c$ in Equation 3 is the predicted collapse strength, $P_E$ and $P_Y$ are an elastic collapse strength and an entire surface yield strength respectively, and H and γ are correction terms and are computed using Equation 4 to Equation 15, provided that in Equation 4 to Equation 15, E is the Young's modulus, v is the Poisson's ratio, u is the ovality represented by Equation 11, e is the eccentricity represented by Equation 12, $\sigma_{R0}$ is the residual stress in the circumferential direction, $\sigma_{CDOS}$ is the collapse dominant proof stress, and values represented by $h_\alpha$, $h_\beta$, $h_\gamma$, α,β, ζ, and η are coefficients that are obtained in advance, $$P_E = 2\left(\frac{E}{1-v^2}\right)\left(\frac{1}{D/t(D/t-1)^2}\right)F_E(D/t)G_E(\sigma_{CDOS}) \quad \text{(Equation 4)}$$

$$P_Y = 2\sigma_{CDOS}\frac{D/t-1}{(D/t)^2}\left[1 + \frac{1.47}{D/t-1}\right]F_Y(D/t)G_Y(\sigma_{CDOS}) \quad \text{(Equation 5)}$$

$$H = h_\alpha u(\%) + h_\beta e(\%) + h_\gamma\left(\frac{\sigma_{R\theta}}{\sigma_{CDOS}}\right) \quad \text{(Equation 6)}$$

$$F_E(D/t) = \sum_{i=1}^{5} \alpha_i^E (D/t)^{i-3} \quad \text{(Equation 7)}$$

$$F_Y(D/t) = \sum_{i=1}^{5} \alpha_i^Y (D/t)^{i-3} \quad \text{(Equation 8)}$$

$$G_E(\sigma_{CDOS}) = \sum_{i=1}^{5} \beta_i^E (\sigma_{CDOS})^{i-3} \quad \text{(Equation 9)}$$

$$G_Y(\sigma_{CDOS}) = \sum_{i=1}^{5} \beta_i^Y (\sigma_{CDOS})^{i-3} \quad \text{(Equation 10)}$$

ovality $u$ (%) = (Equation 11)
(maximum outer diameter − minimum outer diameter)/ average outer diameter × 100 eccentricity $e$ (%) = (Equation 12)
(maximum thickness − minimum thickness)/ average thickness × 100

$$\gamma = F(u, D/t) - f(u)g(D/t) \quad \text{(Equation 13)}$$

$$f(u) = \sum_{i=1}^{3} \xi_i (u)^{i-1} \quad \text{(Equation 14)}$$

$$g(D/t) = \sum_{i=1}^{3} \eta_i (D/t)^{i-1} \quad \text{(Equation 15)}$$

13. The collapse strength prediction method according to claim 9,
wherein Equation 7 is represented by $$F_E(D/t) = 9.39\times10^{-1} + 3.37\times10^{-2}\times(D/t) - 3.70\times10^{-4}\times(D/t)^2 \quad \text{(Equation 16)},$$

Equation 8 may be represented by $$F_Y(D/t) = 1.17 - 1.35\times10^{-2}(D/t) - 3.49\times10^{-5}\times(D/t)^2 \quad \text{(Equation 17)},$$

Equation 9 may be represented by $$G_E(\sigma_{CDOS}) = 9.54(\sigma_{CDOS})^{-2} - 1.85\times10\times(\sigma_{CDOS})^{-1} + 6.41\times10^{-1} + 4.57\times10^{-5}\times(\sigma_{CDOS}) \quad \text{(Equation 18)},$$

Equation 10 may be represented by $$G_Y(\sigma_{CDOS}) = 1 \quad \text{(Equation 19)},$$

Equation 14 may be represented by $$f(u) = 9.39\times10^{-1} + 1.11\times10^{-2}\times(u) + 2.15\times10^{-2}\times(u)^2 \quad \text{(Equation 20)},$$ and Equation 15 may be represented by $$g(D/t) = 1.08 + 7.06\times10^{-8}\times(D/t) + 7.85\times10^{-7}\times(D/t)^2 \quad \text{(Equation 21)}.$$

14. The collapse strength prediction method according to claim 10,
wherein Equation 7 is represented by $$F_E(D/t) = 9.39\times10^{-1} + 3.37\times10^{-2}\times(D/t) - 3.70\times10^{-4}\times(D/t)^2 \quad \text{(Equation 16)},$$

Equation 8 may be represented by $$F_Y(D/t) = 1.17 - 1.35\times10^{-2}(D/t) - 3.49\times10^{-5}\times(D/t)^2 \quad \text{(Equation 17)},$$

Equation 9 may be represented by $$G_E(\sigma_{CDOS}) = 9.54(\sigma_{CDOS})^{-2} - 1.85\times10\times(\sigma_{CDOS})^{-1} + 6.41\times10^{-1} + 4.57\times10^{-5}\times(\sigma_{CDOS}) \quad \text{(Equation 18)},$$

Equation 10 may be represented by $$G_Y(\sigma_{CDOS}) = 1 \quad \text{(Equation 19)},$$

Equation 14 may be represented by $$f(u) = 9.39\times10^{-1} + 1.11\times10^{-2}\times(u) + 2.15\times10^{-2}\times(u)^2 \quad \text{(Equation 20)},$$ and Equation 15 may be represented by $$g(D/t) = 1.08 + 7.06\times10^{-8}\times(D/t) + 7.85\times10^{-7}\times(D/t)^2 \quad \text{(Equation 21)}.$$

15. The collapse strength prediction method according to claim 11, wherein Equation 7 is represented by $$F_E(D/t) = 9.39 \times 10^{-1} + 3.37 \times 10^{-2} \times (D/t) - 3.70 \times 10^{-4} \times (D/t)^2 \quad \text{(Equation 16)},$$

Equation 8 may be represented by $$F_Y(D/t) = 1.17 - 1.35 \times 10^{-2} (D/t) - 3.49 \times 10^{-5} \times (D/t)^2 \quad \text{(Equation 17)},$$

Equation 9 may be represented by $$G_E(\sigma_{CDOS}) = 9.54(\sigma_{CDOS})^{-2} - 1.85 \times 10 \times (\sigma_{CDOS})^{-1} + 6.41 \times 10^{-1} + 4.57 \times 10^{-5} \times (\sigma_{CDOS}) \quad \text{(Equation 18)},$$

Equation 10 may be represented by $$G_Y(\sigma_{CDOS}) = 1 \quad \text{(Equation 19)},$$

Equation 14 may be represented by $$f(u) = 9.39 \times 10^{-1} + 1.11 \times 10^{-2} \times (u) + 2.15 \times 10^{-2} \times (u)^2 \quad \text{(Equation 20), and}$$

Equation 15 may be represented by $$g(D/t) = 1.08 + 7.06 \times 10^{-8} \times (D/t) + 7.85 \times 10^{-7} \times (D/t)^2 \quad \text{(Equation 21)}.$$

16. The collapse strength prediction method according to claim 12, wherein Equation 7 is represented by $$F_E(D/t) = 9.39 \times 10^{-1} + 3.37 \times 10^{-2} \times (D/t) - 3.70 \times 10^{-4} \times (D/t)^2 \quad \text{(Equation 16)},$$

Equation 8 may be represented by $$F_Y(D/t) = 1.17 - 1.35 \times 10^{-2} (D/t) - 3.49 \times 10^{-5} \times (D/t)^2 \quad \text{(Equation 17)},$$

Equation 9 may be represented by $$G_E(\sigma_{CDOS}) = 9.54(\sigma_{CDOS})^{-2} - 1.85 \times 10 \times (\sigma_{CDOS})^{-1} + 6.41 \times 10^{-1} + 4.57 \times 10^{-5} \times (\sigma_{CDOS}) \quad \text{(Equation 18)},$$

Equation 10 may be represented by $$G_Y(\sigma_{CDOS}) = 1 \quad \text{(Equation 19)},$$

Equation 14 may be represented by $$f(u) = 9.39 \times 10^{-1} + 1.11 \times 10^{-2} \times (u) + 2.15 \times 10^{-2} \times (u)^2 \quad \text{(Equation 20), and}$$

Equation 15 may be represented by $$g(D/t) = 1.08 + 7.06 \times 10^{-8} \times (D/t) + 7.85 \times 10^{-7} \times (D/t)^2 \quad \text{(Equation 21)}.$$

\* \* \* \* \*

UNITED STATES PATENT AND TRADEMARK OFFICE
CERTIFICATE OF CORRECTION

| | |
|---|---|
| PATENT NO. | : 11,017,054 B2 |
| APPLICATION NO. | : 16/337691 |
| DATED | : May 25, 2021 |
| INVENTOR(S) | : Yukinobu Nagata et al. |

It is certified that error appears in the above-identified patent and that said Letters Patent is hereby corrected as shown below:

On the Title Page

Please change:
"(71) Applicant: NIPPON STEEL & SUMITOMO METAL CORPORATION, Tokyo (JP)"

To:
-- (71) Applicant: NIPPON STEEL CORPORATION, Tokyo (JP) --

Signed and Sealed this
Thirteenth Day of December, 2022

Katherine Kelly Vidal
*Director of the United States Patent and Trademark Office*